Figure 1:
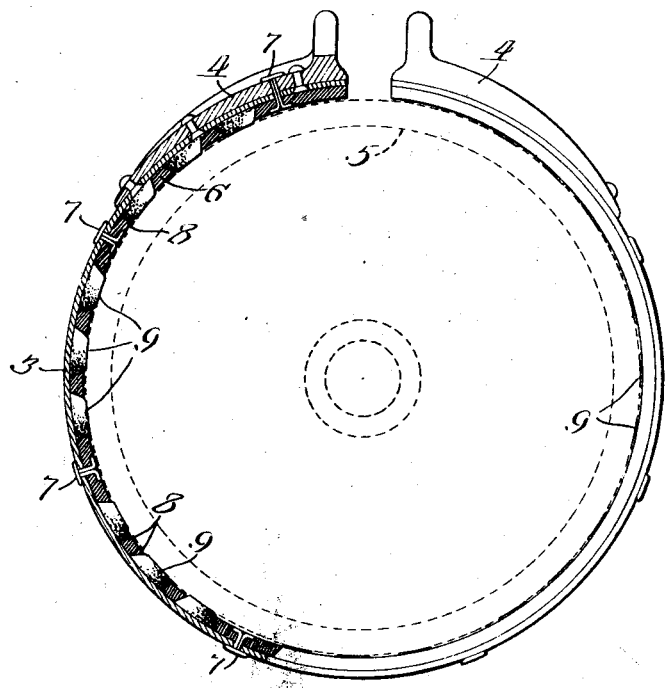

J. H. SARIS.
BRAKE OR CLUTCH BAND.
APPLICATION FILED JULY 28, 1915.

1,184,701.

Patented May 23, 1916.

Inventor:
Joseph H. Saris
by Pond & Wilson
Attys.

UNITED STATES PATENT OFFICE.

JOSEPH H. SARIS, OF BELOIT, WISCONSIN.

BRAKE OR CLUTCH BAND.

1,184,701.  Specification of Letters Patent.  Patented May 23, 1916.

Application filed July 28, 1915. Serial No. 42,386.

*To all whom it may concern:*

Be it known that I, JOSEPH H. SARIS, a citizen of the United States, residing at Beloit, in the county of Rock and State of Wisconsin, have invented certain new and useful Improvements in Brake or Clutch Bands, of which the following is a specification.

This invention relates to friction devices and has more particular reference to brake or clutch bands employed in planetary gear transmissions, especially those used on automobiles.

Planetary gear transmissions of this character embodying both clutch and brake bands are designed to run in oil, that is, in a casing containing oil so that the parts will be kept well lubricated. Under these conditions it has been found very difficult to provide lining for the bands that will not only be practical, durable, and efficient, but serve as an ideal frictional-engaging means such as will not have a sharp and chattering gripping effect when engaging the driven member. Heretofore, so far as I am aware, the practice has been to provide brake and clutch bands of the character described with lining made of coarse, tough, woven fabric treated with certain liquids for rendering the fabric more durable and efficient. However, the face of this lining after a period of usage becomes hard and smooth so that in effect its operation is very similar to that of a metallic band engaging a metallic driven member. Consequently a band lining of this character used in a planetary gear transmission is objectionable, since its frictional engagement is sharp and often chattering if the band is tightened too quickly. To remedy this objectionable feature, it has been the practice to remove the bands and provide them with new linings. This practice, however, may be attributed to the inability to secure band linings such that will operate in an efficient and satisfactory manner.

The primary object of my invention therefore is to obviate the objectionable features mentioned above by providing a brake or clutch band of such construction that it will possess frictional engaging and wearing qualities productive of a high degree of efficiency. In effecting this object, my invention, generally stated, consists in the provision of a friction device having a non-metallic body providing a friction face which is interspersed with slightly projecting portions or inserts of resiliently compressible material, such, for instance as cork, having a coefficient of friction higher than that of the non-metallic body. This non-metallic body composed preferably of tough coarse, processed fabric is adapted to give prolonged wear and withstand heavy strain. By this means, when the friction device is applied to a driven member, for instance, as a brake or clutch band is tightened on a revolving drum, very smooth and even frictional engagement is obtained. Sharp and sudden gripping action is prevented by the inserts which have a neutralizing effect in that they initially engage the driven member and as the force applied to the friction device is increased, the inserts are compressed flush with the face of the non-metallic body which is then brought into full engagement with the driven member. Thus the greatest strain and wear is taken by the non-metallic body, since under the extreme application of the friction device the inserts are compressed and act just sufficiently to prevent the major portion of the friction face, that is, the said non-metallic face, from sharply engaging the driven member or from chattering during the act of engaging said member.

Figure 2:
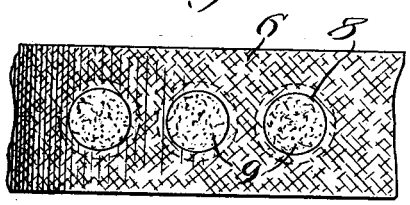

In the accompanying drawing, wherein I have illustrated a brake or clutch band constructed according to my invention—Figure 1 is a side view of the band showing a portion thereof in section; and Fig. 2 is a view of a portion of the face of the lining.

The metallic band designated by reference character 3, constituting the frame of the friction device has secured to the outer sides of its ends brackets 4 adapted to be operated by means, not shown, to frictionally engage the band with a driven member 5 shown in dotted lines. The brake lining 6, secured to the inner side of the band 3 by means of circumferentially spaced rivets 7, is formed of a tough, coarse fabric treated or processed with a suitable viscid, oily liquid so as to enhance its wearing qualities. This lining or face may, however, be of other suitable non-metallic material, such as vulcanized fiber, especially adapted for use as a friction face and to withstand considerable wear and strain. Intermediate the rivets 7, the lining is formed with a plurality of apertures 8, larger at the outer side of the lining than at the inner, in the present instance, the apertures being circular and of greater diameter adjacent to the band than at the face of the lining. Frusto-conically shaped inserts 9 fit snugly in the apertures 8, as shown, and project slightly beyond the face of the non-metallic body 6. These inserts are of a resiliently compressible material having a coefficient of friction higher than that of the non-metallic face. Material well suited for this purpose is cork, which may be easily obtained and possesses the desirable qualities. By this construction, it will be noted that the inserts are securely confined between the lining and band and that even after the lining has become worn so as to be materially lessened in thickness, the inserts will be still retained in position by reason of their marginal portions being confined between the lining and band. It will be here noted that such construction permits inserts to be secured in a brake or clutch band in a very simple manner and that a comparatively thin lining of a desired quality may be used. The effect of cork inserts in a friction device of the character described is to make the frictional engagement smooth and free from chattering, sharp gripping action, as described above.

My improved friction device, which is well adapted and especially designed for use in planetary gear transmissions, effects a marked improvement in the control of automobiles equipped with this friction device. It is a well known fact that the clutch and brake control of automobiles employing planetary gear transmissions is far from satisfactory, this being due not only to the character of the band lining heretofore employed in the friction bands of these transmissions, but to the careless and improper manner of operating the brake and clutch bands. My improvements reduce to a minimum the possibility of chattering and sudden gripping action of the frictionally engaging members, even though these members are improperly and suddenly engaged under a heavy load, and insures a smooth, gradual and finally positive engagement when operated with reasonable care.

I claim:

1. A brake or clutch element comprising a flexible non-metallic strip, having inserts, said strip and the adjacent faces of the inserts constituting friction surfaces of relatively different co-efficiency and of relatively different elevations, the elevated surfaces being adapted to first engage the member to which the strip is applied and upon compression to permit engagement thereof by the lower surfaces.

2. A brake or clutch element comprising a flexible non-metallic friction strip having projecting portions of compressible friction material, the ends of the projecting portions being adapted when the latter are compressed to be flush with the engaging face of the strip to constitute therewith a continuous friction surface.

JOSEPH H. SARIS.